April 8, 1952 L. M. FIELD 2,591,689

HIGH-DENSITY BEAM CONTROL

Filed June 23, 1945 4 Sheets-Sheet 1

INVENTOR.
LESTER M. FIELD

BY

Robert Harding Jr.
ATTORNEY

INVENTOR.
LESTER M. FIELD
BY
Robert Harding Jr
ATTORNEY

April 8, 1952 L. M. FIELD 2,591,689

HIGH-DENSITY BEAM CONTROL

Filed June 23, 1945 4 Sheets-Sheet 3

INVENTOR.
LESTER M. FIELD

BY Robert Harding Jr.

ATTORNEY

INVENTOR.
LESTER M. FIELD
BY
Robert Harding Jr.
ATTORNEY

Patented Apr. 8, 1952 2,591,689

UNITED STATES PATENT OFFICE 2,591,689

HIGH-DENSITY BEAM CONTROL

Lester M. Field, New York, N. Y., assignor to International Standard Electric Corporation, New York, N. Y., a corporation of Delaware Application June 23, 1945, Serial No. 601,095

5 Claims. (Cl. 315—15)

Figure 1:
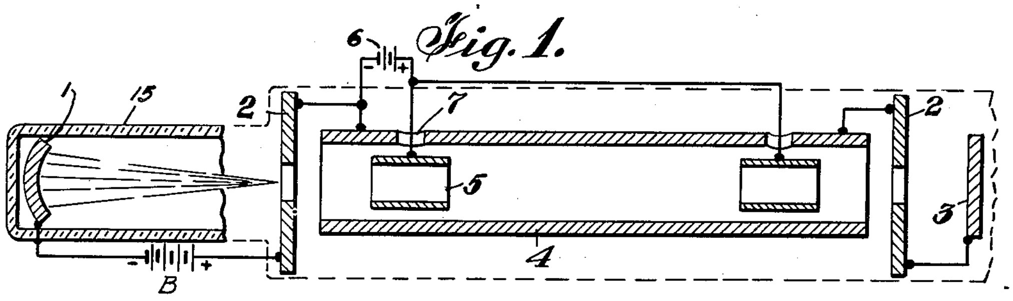

This invention relates to electron beam tubes, more particularly to tubes such as the velocity modulation type wherein the electron beam traverses a field-free space for a comparatively great distance.

In tubes of these types it is desirable to produce an electron beam of high density, that is, a beam having as little spread as possible, somewhat analogously to the production of a highly concentrated beam of light for projection over a distance. Such tubes are of great use in the electronic art, examples being velocity modulation tubes, beam-power transmitting and receiving tubes, television projecting tubes, high-intensity X-ray tubes, and other similar devices.

In tubes of the types just mentioned, maximum efficiency and control depends, inter alia, upon the production of an electron beam of relatively small cross section, carrying as large a current as possible at as low a potential as possible, i. e., a relatively low impedance electron beam. In such tubes the production of a beam of this type is beset with several difficulties, one greatly detrimental factor being the tendency of the beam, once produced, to spread out as it progresses along its path, due to the mutually repellent action caused by the space charge effect of the electrons in the beam.

As one means of preventing this spreading out of the electron beam, the art has depended to a large extent upon the ionization of molecules of residual gas within the tube, the positive ions formed by the impact of electrons from the beam upon such gas molecules tending to neutralize the negative charges of the beam electrons and thus reduce the mutual repulsion of the latter. The problem has been complicated by the question of the degree of vacuum existing within the tube, the number of positive ions produced being dependent upon the number of residual gas molecules present. Several factors have contributed to the production of tubes with increasingly high vacua and at these higher vacua fewer positive ions are produced, so that this remedy for beam-spread has become decreasingly potent in its effect.

With the advent of tubes embodying a field-free region, such as realized by a drift tube, it had been assumed that the generally provided enclosure of such field-free space by a conductive tube would allow the positive ions produced from residual gas to collect within the beam and therefore would cause them to exert a greater and more continued restraining action upon the undesirable spread of the electron beam. Experience with cathode ray tubes incorporating drift tubes of substantial length, has shown, however, that the beam spread continues to take place to an undesirable degree and that the positive ions fail to exert upon the electron stream the restraining action to the extent which they should do, according to the theory above outlined.

The existence of undesirable beam spread in tubes of this type has become a detrimental factor whose importance has increased with the use of higher vacua and increasing currents. More specifically, well known formulae for the degree of ionization taking place under conditions existing in a moderately high powered velocity modulation tube, show that there should be produced sufficient positive ions to neutralize the charges within the electron beam, provided that the gas pressure be not reduced much below $10^{-7}$ mm./Hg, a degree of vacuum near which commercial tubes are expected to operate.

The discrepancy between the remedial effect of gas ionization postulated by theory and the actual insufficient effect produced in practice has hitherto remained unsatisfactorily explained, although several reasons for its occurrence have been suggested. Lacking any satisfactory explanation for this undesirable phenomenon, no way has been found in the prior art of overcoming the same by purely electrostatic means and recourse to electromagnetic concentrating devices has been found necessary.

The problem of ascertaining the cause and providing a remedy for the insufficiency of result obtained at normal gas pressure was the subject of consideration in a prior joint application, Serial No. 447,194 filed on June 15, 1942, by K. Spangenberg, R. Helm and myself, and issued on March 2, 1948, as Patent No. 2,436,833. The present application may be regarded as an improvement thereon respecting the means and method of the solution of the above stated problem. In said joint application, an explanation of the above-mentioned discrepancy was postulated and, thereafter, both theoretical and experimental bases to substantiate the same, were given. According to the conclusions therefrom, the inadequacy of the positive ion supply, as indicated theoretically to neutralize the space charge effect, was due to a leakage of the produced positive ions from the beam near the ends of the drift tube enclosing the field-free region. This leakage was produced by certain field conditions generally existing in tubes at the point referred to. The explanation was carried further to the effect that following the leakage as stated, other positive ions existing within the beam would then, by movement toward the end impelled by then existing electrostatic conditions in the beam, be swept out like those above mentioned so that within the beam there would not any longer be a sufficient amount of positive ions to prevent beam spread. Accordingly it seemed reasonable to expect that if new field conditions were properly established they could be relied on for preventing the leakage. In the embodiment in said joint application it was found that, as the potential of the drift tube was made slightly lower than the potential of the region just beyond each end of the drift tube, either by directly using a new and low voltage source or utilizing the potential drop through a resistance connected between the drift tube and adjacent electrodes, spreading of the beam within the drift tube was prevented. In case the resistance was used, reliance was had on the flow of current resulting from a collection on the drift tube of stray electrons. The embodiment of the invention thus described is broadly and specifically claimed in said joint application.

Upon further consideration of the problem, I have found that certain changes in structure as well as circuit can be used and that under certain circumstances in practice, they will be productive of advantages as regards flexibility of the means and method used, the possibility of their improved adaptation in the overall design of tubes of this type, and the general distinctness which they exhibit over related structures.

An object of my invention is to produce a beam tube having a structure designed to overcome beam spread.

A further object is to produce a beam tube having structure and cooperating circuit arrangements for preventing beam spread.

Another object is to provide new circuit arrangements whereby electric fields are produced and applied to tubes to overcome tendency to beam spread.

A still further object is to arrange the new circuit systems so that the electric fields provided for preventing beam spread shall be independent of the leakage field through an associated apertured acceleration electrode.

It is also an object of my invention to improve the structure and fundamental circuits in general of beam tubes, particularly those having extremely high vacua and wherein also the beam shall be of low impedance of high density.

Further objects of my invention and a better understanding thereof will be obtained from a disclosure of one or more embodiments of the same appearing in the following specification and accompanying illustrative drawing.

Figure 2:
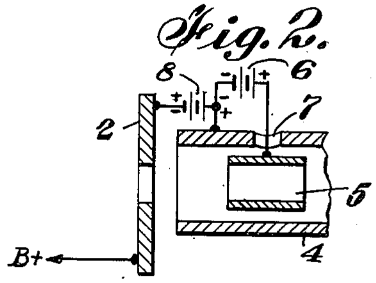
Figure 3:
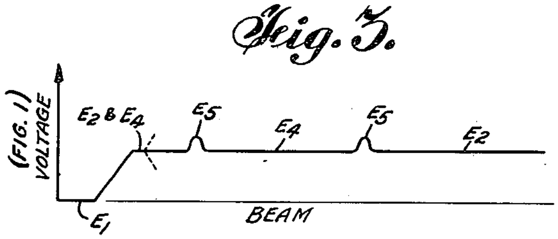
Figure 4:
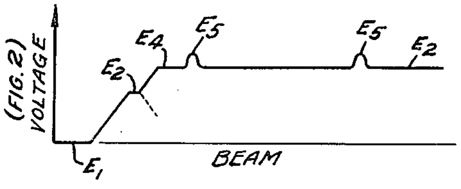
Figure 5:
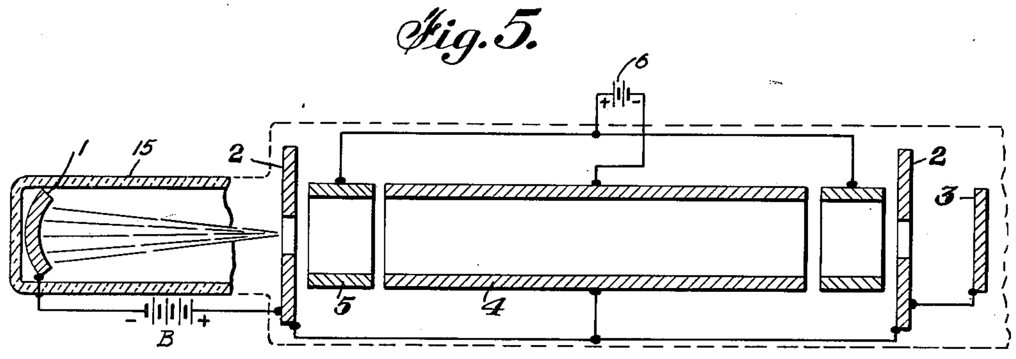
Figure 6:
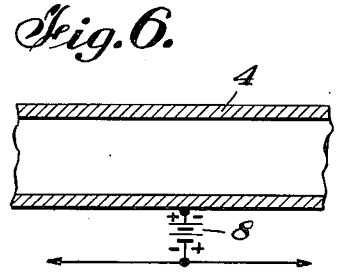
Figure 9:
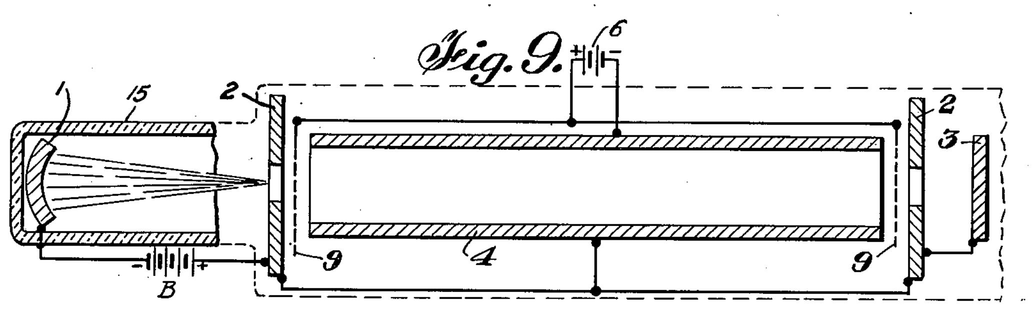
Figure 10:
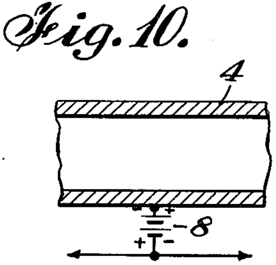
Figure 11:
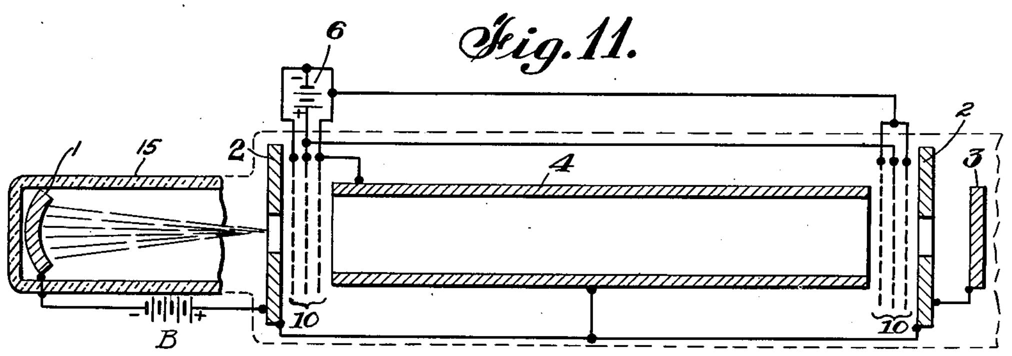
Figure 12:
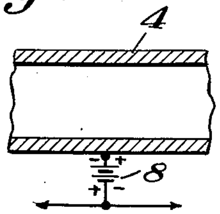
Figure 14:
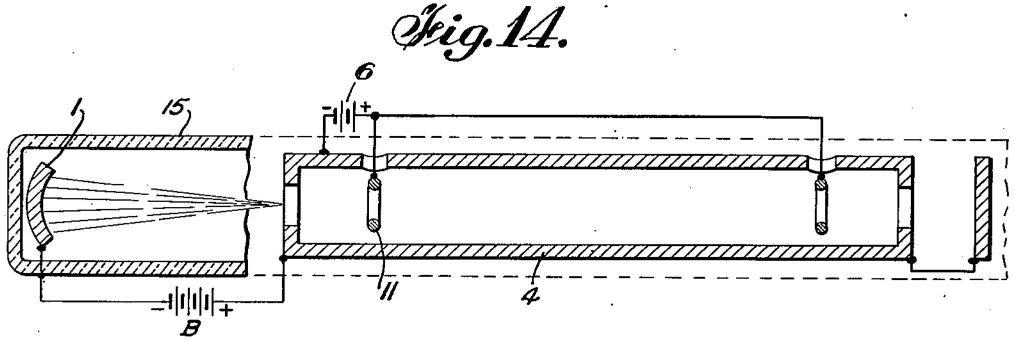
Figure 15:
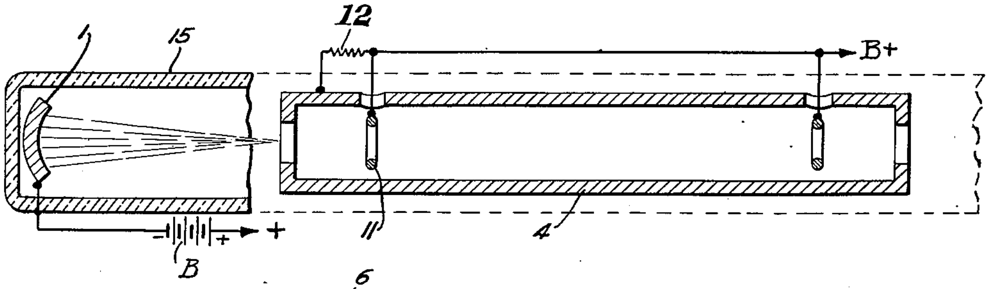

In the drawings, Fig. 1 illustrates a first system showing partly diagrammatically and partly in section certain of the parts of a cathode ray beam tube to which my invention has been applied, and Fig. 2 shows fragmentarily a circuit modification of a portion of the system of Fig. 1, while Figs. 3 and 4 indicate voltage characteristics taken longitudinally of the tube. Fig. 5 is a view similar to Fig. 1 but showing a second system having another structural form including a short cylinder and Fig. 6 shows a modification of Fig. 5 while Figs. 7 and 8 indicate voltage characteristics longitudinally of the tube. Fig. 9 is a view similar to Fig. 1 but showing a third system utilizing an electrode of wire mesh material and Fig. 10 illustrates a circuit modification of this third system. Fig. 11 is a view similar to Fig. 1 but showing a fourth system using a combination electrode structure. Fig. 12 shows a circuit modification of a portion of Fig. 11 while Fig. 13 indicates a voltage characteristic of this fourth system taken longitudinally of the tube. Figs. 14 and 14a are views similar to Fig. 1 but using a structural modification of both the drift tube and apertured elements and Fig. 15 is a view similar to Fig. 14 but showing a circuit modification thereof.

In the system of Fig. 1, I have shown only such parts of a cathode ray beam tube as are necessary to illustrate my invention. It is understood that inside the usual glass envelope 15, the usual cathode 1, accelerating and focusing electrodes including apertured plates 2 and back plate 3 together with the necessary sources of voltage will be provided. Additionally I have shown a drift, or field-free boundary, tube 4 and adjacent its ends, the apertured elements or electrodes. In the first system there is a field-establishing electrode in the form of an inner cylinder 5 within and near each end of the drift tube to which a source of voltage 6 is suitably connected as for example, through an opening 7 in the drift tube wall. This source provides a potential on the inner cylinder which is a few volts positive respecting that applied to the drift tube. The range of values assignable to the different degrees of positive potential might not vary materially from that described in considerable detail in said joint application for the case where a negative gradient was introduced. It is sufficient for the purposes of my invention to state that in a practical case this potential value may vary between 15 and 30 volts as against an order of 6500 to 7000 volts applied to the drift tube. In such a practical case to which my invention is applicable the vacuum of the beam tube may range in the order of $10^{-7}$ mm. Hg. In providing an ion trap as described above, it should be understood that the potential relation between drift tube and the apertured plates is not critical, that is to say, the drift tube may be at either higher or lower potential as an illustration of these conditions, a source of voltage 8 may be inserted in the connection between the apertured element and the drift tube and so poled as to indicate that, if desired, the drift tube may be operated at a higher or lower potential than the apertured element. This is shown in Fig. 2. The voltage relations which are present at different points along the path of the beam are shown and indicated in a way which is self-explanatory in Figs. 3 and 4. The voltage of each element is indicated by the letter E followed by the number of the element.

It will be seen from the foregoing, that I have provided a system wherein an electrostatic field of small value is applied to the beam, which is independent of the leakage field through the apertured plate, or of the potential of the accelerating electrode, respecting the cathode, or of the drift tube respecting the cathode so as to constitute a positive-ion trap to prevent ions from escaping from within the beam out through its end and depleting the supply of such ions relied on for neutralizing beam space charge.

Figure 7:
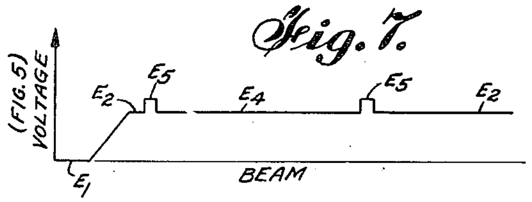
Figure 8:
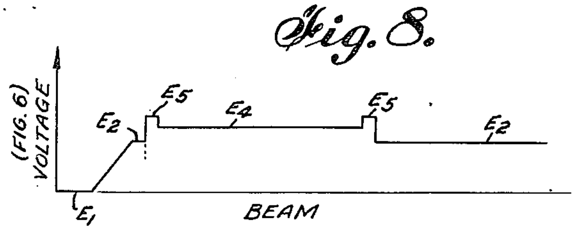

In the second system illustrated in the Figs. 5–8, I have shown a modification wherein the field-establishing electrode is still of cylindrical form but is located in alignment with the end of the drift tube end and between the same and the apertured element. In this instance, there is provided the excess positive potential as in the case of the first system and likewise there are two cases in one of which the drift tube and the apertured elements are at the same potential as in Fig. 5, and in the other they are at some different potential higher or lower than the drift tube as shown in Fig. 6. These voltage relations are shown in Figs. 7 and 8.

A further modification is illustrated in Figs. 9 and 10 which together constitute a third system. In this system the additional electrode assumes the form of a wire mesh grid 9 which is located in the path of the beam and between an end of the drift tube and the corresponding apertured plate. In this system also, there are the two cases, one shown in Fig. 9 in which the drift tube and the apertured plate are at the same potential while in the detail modification of Fig. 10 a battery 8 is shown between said two elements in order to made the drift tube operate at a different potential than the apertured plate.

Figure 13:
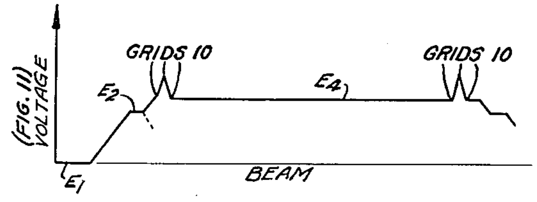
Figure 14A:
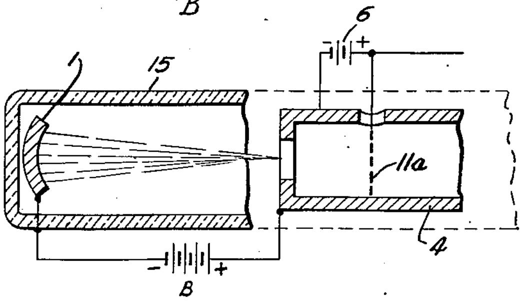

In a fourth system shown in Figs. 11, 12 and 13 the grid structure as shown in the previous system is modified so that it is constituted by a plurality of such grids 10, one of which will be at a higher potential than those on either side of it and here also are two cases in which the drift tube is either at a different potential than the apertured plate as shown in Fig. 12 or at the same potential as shown in Fig. 11. Likewise, Fig. 13 shows the voltage characteristic in a manner similar to that of Fig. 8. In this fourth system it is to be noted that the composite mesh structure constitutes in itself an ion trap. In case where such a composite mesh is applied at each end of the drift tube the outside meshes at both ends may be interconnected and likewise the inner meshes.

In a fifth system as illustrated in Fig. 14 the original elements, namely the drift tube and the aperture plates are constructed to be integral and the additional electrode may as shown, take the form of a cylinder as in the case of the first system or an annulus 11 and may likewise have its circuit lead inserted through an opening in the tubular wall of the integral structure. The connections for the extra electrode or electrodes are the same as in the first system. Here also a mesh grid 11*a* may be substituted for the annulus as shown in Fig. 14*a*.

In a sixth system shown in Fig. 15, the apertured plates and the drift tube are integral in structure like that in the fifth system. The electrical connection however to the additional electrode or electrodes is such that the electrodes are directly connected to the positive pole of the source B while the integral tube structure is excited by an extension from the same connection by the drop through a resistor. This resistor in a particular case may have a value of the order of 100 to 100,000 ohms.

While I have thus described certain specific embodiments which my invention may take it is to be understood that it is not limited to such particular embodiments for it is obvious that many widely different arrangements are possible for carrying my invention into effect; nor on the other hand is my invention to be confused with cases in which electrostatic fields for other purposes and usually of orders of value different from mine have been applied to beam and analogous tubes, such as for varying electron velocity or for focusing beams and the like. Accordingly, my invention is to be regarded as that which is defined in the appended claims.

What I claim is:

1. A high density beam electron tube comprising an envelope having therein means for producing an electron beam, a hollow electrode positioned about and along the path of said beam for defining a field-free region, at least one additional electrode arranged inside said hollow electrode adjacent an end thereof, and potential applying means connected to said hollow electrode and said additional electrode for maintaining said additional electrode at a positive potential with respect to said hollow electrode whereby ions are trapped in the path of the electron beam adjacent a boundary of the field-free region.

2. A tube as set forth in claim 1 in which said hollow electrode and said additional electrode comprise concentric cylinders.

3. A tube as set forth in claim 1 in which said hollow electrode comprises a cylindrical electrode and said additional electrode comprises an annulus arranged inside said hollow electrode about said beam path.

4. A tube as set forth in claim 1 in which the potential applying means comprises leads from said additional electrode arranged through apertures in said hollow electrode and connected together.

5. A tube as set forth in claim 1 in which the said additional electrode comprises a mesh grid.

LESTER M. FIELD.

REFERENCES CITED

The following references are of record in the file of this patent:

UNITED STATES PATENTS

| Number | Name | Date |
|---|---|---|
| 2,126,287 | Schlesinger | Aug. 9, 1938 |
| 2,424,965 | Brillouin | Aug. 5, 1947 |